United States Patent
Dione

(10) Patent No.: US 7,366,674 B2
(45) Date of Patent: Apr. 29, 2008

(54) OCCUPANT MANAGEMENT METHOD, SYSTEM, AND PROGRAM PRODUCT

(76) Inventor: Diegane Dione, 6860 108th St., Apt. 2-F, Forest Hills, NY (US) 11375

( * ) Notice: Subject to any disclaimer, the term of this patent is extended or adjusted under 35 U.S.C. 154(b) by 0 days.

(21) Appl. No.: 10/764,258

(22) Filed: Jan. 23, 2004

(65) Prior Publication Data

US 2004/0153334 A1 Aug. 5, 2004

Related U.S. Application Data

(60) Provisional application No. 60/497,646, filed on Aug. 25, 2003, provisional application No. 60/449,373, filed on Feb. 24, 2003, provisional application No. 60/442,811, filed on Jan. 24, 2003.

(51) Int. Cl.
  *G06Q 10/00* (2006.01)
(52) U.S. Cl. .......................................... 705/1
(58) Field of Classification Search ............... 705/1
  See application file for complete search history.

(56) References Cited

U.S. PATENT DOCUMENTS

| | | | |
|---|---|---|---|
| 4,023,146 A | 5/1977 | Carroll | |
| 5,815,417 A | 9/1998 | Orr et al. | |
| 6,032,132 A * | 2/2000 | Nelson | 705/34 |
| 6,348,860 B1 | 2/2002 | Davis et al. | |
| 6,380,851 B1 * | 4/2002 | Gilbert et al. | 340/517 |
| 6,624,750 B1 | 9/2003 | Marman et al. | |
| 6,754,674 B2 * | 6/2004 | Meyers et al. | 707/104.1 |
| 2001/0027389 A1 | 10/2001 | Beverina et al. | |
| 2002/0029129 A1 | 3/2002 | Satoh et al. | |
| 2002/0053978 A1 | 5/2002 | Peterson et al. | |
| 2002/0084900 A1 | 7/2002 | Peterson et al. | |
| 2002/0116242 A1 | 8/2002 | Vercellone et al. | |
| 2002/0188571 A1 * | 12/2002 | Pilgrim | 705/59 |
| 2003/0012344 A1 | 1/2003 | Agarwal et al. | |
| 2003/0069002 A1 * | 4/2003 | Hunter et al. | 455/404 |
| 2004/0068517 A1 * | 4/2004 | Scott | 707/104.1 |
| 2004/0168086 A1 * | 8/2004 | Young et al. | 713/201 |
| 2006/0128356 A1 * | 6/2006 | Yamazaki et al. | 455/404.1 |

OTHER PUBLICATIONS

Cantera, Kevin, Emergency Phone-Alery System is Unveiled, May 10, 2002, The Salt Lake Tribune, Salt Lake City Utah, p. C1.*
Lisberg, Adam, Six Towns to Wark Residents by Phone; A Calling System for Emergencies, May 8, 2002, The Record, Bergen County, NJ p. L01.*

* cited by examiner

*Primary Examiner*—Jamisue Plucinski
(74) *Attorney, Agent, or Firm*—Schwegman, Lundberg & Woessner, P.A.

(57) ABSTRACT

An occupant management method, system, and program product that associate occupant information with information about a physical area. For example, the invention can generate a hierarchical representation of a physical area such as a building or the like. The hierarchical representation is used to manage occupants of the physical area. For example, contact information for occupants can be maintained and associated with a physical location, and/or directions can be provided from a starting point to a designated destination point. The hierarchical representation can be used to facilitate two-way communication between an occupant and an emergency responder during an emergency event.

2 Claims, 4 Drawing Sheets

OCCUPANT MANAGEMENT METHOD, SYSTEM, AND PROGRAM PRODUCT

REFERENCE TO PRIOR APPLICATION

The current application claims the benefit of U.S. Provisional Application Nos. 60/442,811, filed on Jan. 24, 2003, 60/449,373, filed on Feb. 24, 2003, and 60/497,646, filed on Aug. 25, 2003, each of which is hereby incorporated herein by reference.

BACKGROUND OF THE INVENTION

1. Technical Field

The invention relates generally to managing occupants of a physical area, such as one or more buildings, and more specifically, to a method, system, and program product that associate occupant information to information regarding a physical area. The physical area information can be used to access the associated occupant information and provide information to occupants.

2. Related Art

For most companies, employees continue to be assigned a desk and/or office within one or more buildings. During the work day, most employees are primarily located at their assigned desk/office. While at work, an employee typically uses a desktop computer, telephone, and the like in the office to communicate with co-workers and perform his/her work. Increasingly, companies are providing employees with personal communication devices such as personal digital assistants (PDAs), pagers, mobile telephones, and the like. These devices enable an employee to communicate with others in the company, check e-mail, check voice mail, etc., when the employee is away from his/her office. Further, employees may purchase one or more personal communication devices that family members and friends typically use to contact the employee. As a result, while at work, there are often several forms of communication that can be used to contact a particular employee.

For a new employee, time may be unnecessarily spent determining the location of various rooms such as a bathroom, conference room, etc. Additionally, an employee may need to determine an office location of a co-worker, or contact information for the co-worker such as an extension. Further, in public buildings such as an airport, a mall, or the like, a user may desire directions to a particular gate, a desired store, etc. While maps are typically provided periodically throughout these buildings, occupants frequently find that they are not convenient or easy to read.

As a result, a need exists for a solution that provides information about occupants of a physical area to another occupant of the physical area in an efficient manner that can be based on the location of the occupant. A further need exists for providing custom directions to an occupant of a building or other structure based on the occupant's current location and a specified destination location. To this extent, a need exists for a solution that generates and/or uses a hierarchical representation of a physical area to provide directions and/or occupant information to an occupant using any type of communication device, and in particular, a wireless communication device such as a PDA or a mobile telephone.

Further, emergency responders such as police, fire, and emergency medical technicians (EMTs), and the like are increasingly being equipped with personal communication devices that allow the responders to maintain contact with each other while responding to an emergency situation. This communication equipment has enabled the responders to cooperate better and respond to the emergency in a more efficient manner. However, to date, little or no communication occurs between the emergency responders and occupants of a building in which the emergency (e.g., a fire) is occurring. As a result, responders must spend a great deal of time and effort in determining whether any occupants remain in a building, the likely location of the occupants, and whether they are safe or in danger. All too often, responders enter an unsafe structure under a mistaken belief that an occupant remains inside, thereby exposing the responder to an unnecessary risk.

As a result, a further need exists for a solution that enables responders and occupants to communicate during an emergency event. In particular, a need exists for a method, system, and program product that obtains information for occupants of a physical area such as a building, and assigns the information to a location in the physical area where the occupant is or is most likely to be located. In this manner, emergency responders can use the information to contact and/or attempt to contact the occupant as well as determine a region within the physical area in which to search for the occupant.

SUMMARY OF THE INVENTION

The invention provides a solution for managing occupants of a physical area. Specifically, under the present invention, occupant information is associated with information about the physical area, and is used to obtain information about and provide information to occupants of the physical area. In one embodiment, a hierarchical representation of the physical area is obtained, and occupant information is associated with the hierarchical representation. In particular, a node that includes occupant information is associated with a node that represents a portion of the physical area in which the occupant is or is likely to be located. The hierarchical representation can be used in various applications. For example, each area node can include directions to exit points for a corresponding parent area. The directions can be used to construct directions for an occupant from a start location to a destination location. Further, contact information for locations and/or occupants can be included to enable various options for contacting an occupant to be readily obtained. In one embodiment, the contact information is used by emergency responders to obtain a status for one or more occupants, and/or allow an emergency responder to communicate with an occupant. The hierarchical representation can be updated dynamically, e.g., based on detected movement of occupants, or can be more static, e.g., based on office locations of occupants. In either case, the invention provides an improved solution for managing occupants of a physical area.

A first aspect of the invention provides a method of managing occupants of a building during an emergency event, the method comprising: obtaining building information for a plurality of areas of the building; associating occupant information for an occupant located at one of the plurality of areas of the building with the corresponding building information; contacting the occupant using the occupant information during the emergency event; and obtaining a status of the occupant.

A second aspect of the invention provides a method of managing occupants of a physical area, the method comprising: obtaining a plan for the physical area; generating a hierarchical representation of the physical area based on the plan, wherein the hierarchical representation includes a plurality of area nodes; obtaining occupant information for an occupant of the physical area; and associating the occupant information with an area node in the hierarchical representation.

A third aspect of the invention provides a system for managing occupants of a physical area, the system comprising: means for obtaining a plan for the physical area; means for generating a hierarchical representation of the physical area based on the plan; means for obtaining occupant information for an occupant of the physical area; and means for associating the occupant information with an area node in the hierarchical representation.

A fourth aspect of the invention provides a computer program product comprising a computer useable medium having computer readable program code embodied therein for managing occupants of a physical area, the program product comprising: program code configured to obtain a plan for the physical area; program code configured to generate a hierarchical representation of the physical area based on the plan; program code configured to obtain occupant information for an occupant of the physical area; and program code configured to associate the occupant information with an area node in the hierarchical representation.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

For convenience purposes only, the following outline is used in the description:

I. Hierachical Representation

II. Overview of an Illustrative System

III. Applications
   A. Directions and Contact Information
   B. Emergency Response IV. Alternatives I. Hierarchical Representation As indicated above, the invention provides a solution for managing occupants of a physical area. Specifically, under the present invention, occupant information is associated with information about the physical area, and is used to obtain information about and provide information to occupants of the physical area. In one embodiment, a hierarchical representation of the physical area is obtained, and occupant information is associated with the hierarchical representation. In particular, a node that includes occupant information is associated with a node that represents a portion of the physical area in which the occupant is or is likely to be located. The hierarchical representation can be used in various applications. For example, each area node can include directions to exit points for a corresponding parent area. The directions can be used to construct directions for an occupant from a start location to a destination location within the physical area. Further, contact information for locations and/or occupants can be included to enable various options for contacting an occupant to be readily obtained. In one embodiment, the contact information is used by emergency responders to obtain a status for one or more occupants, and/or allow an emergency responder to communicate with an occupant. The hierarchical representation can be updated dynamically, e.g., based on detected movement of occupants, or can be more static, e.g., based on office locations of occupants. In either case, the invention provides an improved solution for managing occupants of a physical area.

The following discussion of various aspects of the invention uses one application in which the physical area comprises a building, and more particularly an office building or publicly accessible building. However, it is understood that the teachings of the invention are not limited to this type of application. In particular, the teachings allow the system to be readily scaled into larger applications or smaller applications. To this extent, while the following discussion focuses on a building, it is understood that the teachings apply to any physical area, including other structures (e.g., a stadium or an airport), multiple buildings (e.g., a business park or a city block), a portion of a building, an apartment building, a house, a town or city, etc. Further, while the discussion uses a building plan as an illustrative plan for a physical area, it is understood that this could comprise any type of plan, including a map, a blueprint, etc. Still further, as will be made clear by the discussion below, "occupant" is used to refer to an individual that is, or may be, present within the physical area.

Figure 1:
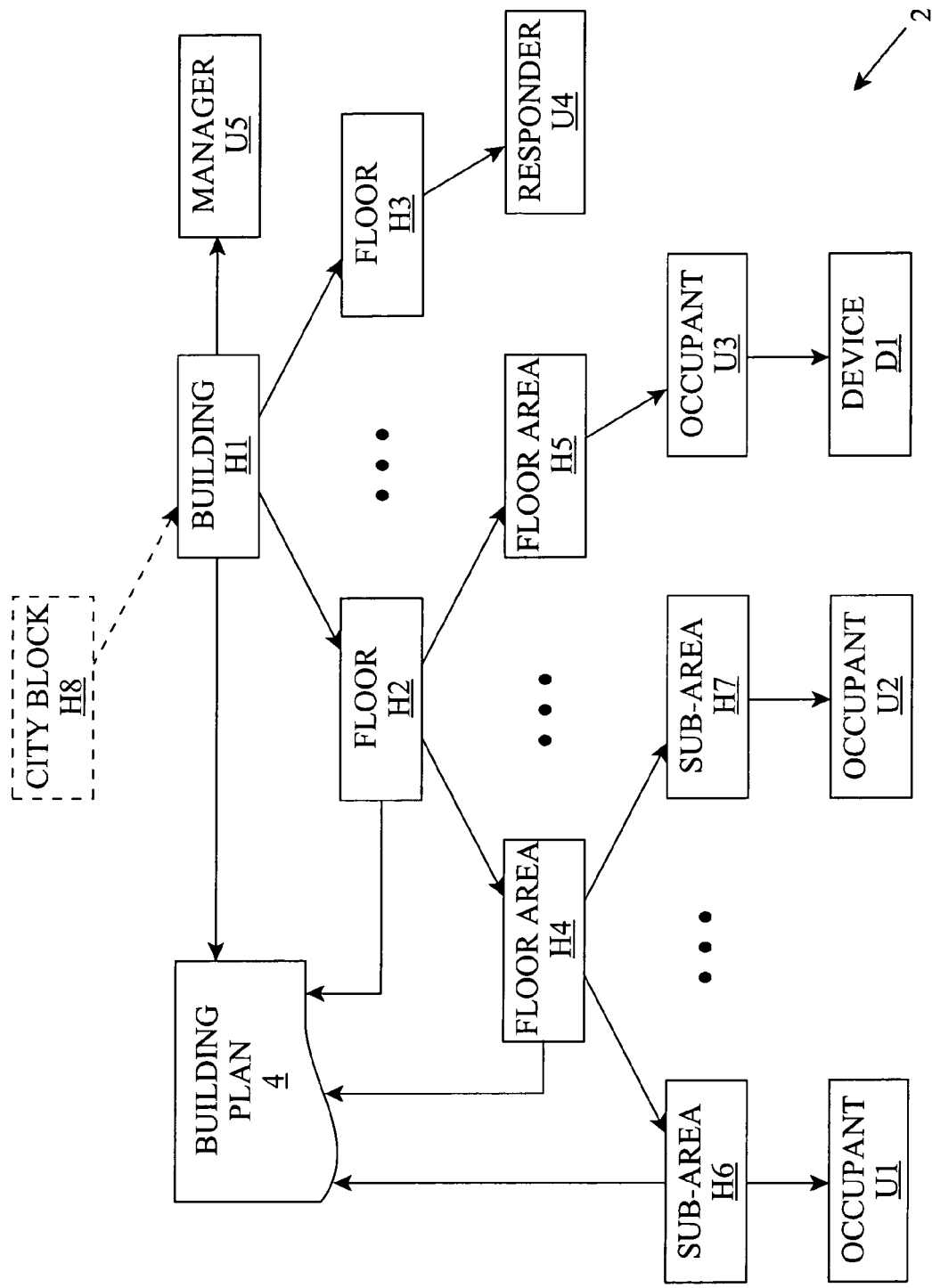
FIG. 1 shows an illustrative hierarchical representation of a building.

As noted previously, one aspect of the invention provides for the generation of information about a physical area such as a building. In one embodiment, a hierarchical representation of the building is generated. In particular, the building can be subdivided in a hierarchical manner into increasingly smaller units of physical area. Each unit of physical area can be represented by an area node in the hierarchical representation, and the area node can include information about the physical area. Turning to the drawings, FIG. 1 shows an illustrative hierarchical representation 2 of a building. Hierarchical representation 2 is shown including a building node H1 for the building as a top level node. However, as discussed above, the physical area could be larger or smaller than a building. To this extent, hierarchical representation 2 could comprise a portion of a larger hierarchical representation. For example, building node H1 could be the child node of a city block node H8. In this manner, hierarchical representation 2 provides an efficient manner for increasing and/or decreasing the scale of the physical area. However, it is understood that hierarchical representation 2 is only illustrative of the various types of data structures that could be used to efficiently store and access information about a physical area. To this extent, the invention is not limited to use of hierarchical representation 2.

Continuing with hierarchical representation 2, an area node such as building node H1 can have one or more child area nodes that each correspond to smaller areas included within the larger area. To this extent, for one or more floors of a building, a floor node H2-H3 can be added as a child of building node H1. Similarly, each floor node H2-H3, can have one or more floor area nodes H4-H5 as a child node that each correspond to unique physical areas of the corresponding floor. A floor area could comprise, for example, one or more rooms that are formed by a fixed wall. Consequently, a hall, a reception area, an office, a bathroom, etc., each could have a floor area node H4-H5 in hierarchical representation 2. When the building comprises an office building, floor area nodes H4-H5 could each represent an area of the corresponding floor that is occupied by a different company. In any event, a floor area may be further sub-divided into rooms, cubicles formed by temporary walls, areas of a room, or the like. As a result, one or more floor area nodes H4-H5 could also have one or more sub-area nodes H6-H7 as a child. It is understood that hierarchical representation 2 is only illustrative. In particular, alternative hierarchical representations may include additional or fewer levels and nodes that subdivide the building using any solution.

Figure 2:
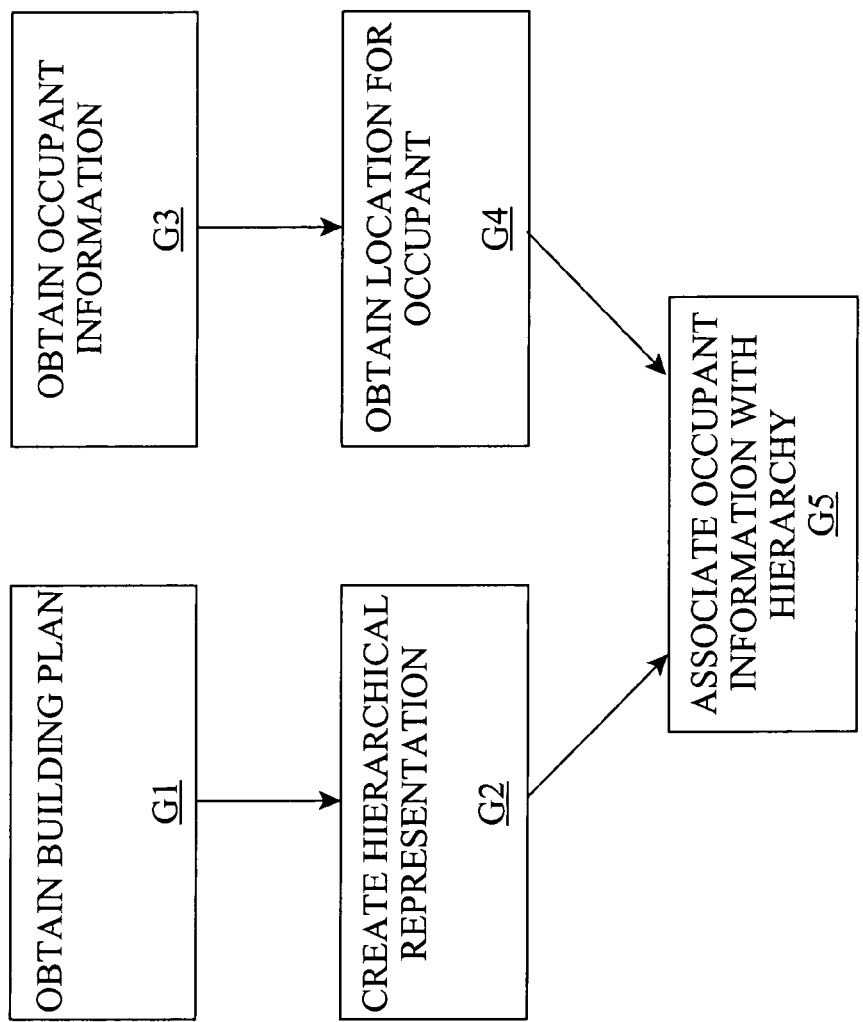
FIG. 2 shows illustrative method steps for generating a hierarchical representation of a building.

FIG. 2 shows an illustrative method for generating the hierarchical representation 2 shown in FIG. 1. In step G1, a building plan 4 (FIG. 1) is obtained. Building plan 4 could comprise a physical copy such as a printed plan, blueprint, etc., or comprise an electronic copy stored on a computer useable medium such as one or more computer-aided design (CAD) drawings, graphic files, etc. In either case, the obtaining step could comprise generating building plan 4, accessing an existing building plan 4, and/or converting building plan 4 from one form (physical copy) into a more suitable form (electronic copy). In any event, building plan 4 will include information on each floor of the building, such as its shape and dimensions, the location of walls, exits, etc.

In step G2, hierarchical representation 2 (FIG. 1) of the building is generated using building plan 4 (FIG. 1). In particular, each unique floor in the building can be identified in building plan 4, and a corresponding floor node H2-H3 (FIG. 1) can be created and added to hierarchical representation 2. Similarly, areas and/or rooms on a floor, cubicles in a room, and the like can be identified in building plan 4 and added to hierarchical representation 2 in the appropriate locations. Floors, areas, sub-areas and the like can be identified manually, automatically, or some combination thereof. For example, a user could refer to a physical building plan 4, and generate hierarchical representation 2. Alternatively, a user could outline an area in an electronic building plan 4 and define a corresponding floor area node H4-H5 or sub-area node H6-H7. Further, a computer program product can be used to identify walls, exit points, etc. in an electronic building plan 4 and automatically generate some or all of hierarchical representation 2.

As shown in FIG. 1, when building plan 4 is in an electronic format, one or more area nodes H1-H7 can be associated with its corresponding portion of building plan 4. For example, each floor node H2-H3 could be linked to the portion of building plan 4 that includes the entire floor, while floor area node H5 may be linked to a particular area of the floor corresponding to floor node H2. By linking one or more area nodes H1-H7 to building plan 4, the portion of building plan 4 that corresponds to a selected area node H1-H7 can be readily displayed to a user in a zoomed in and/or highlighted fashion. Further, a user could view building plan 4 and be provided a corresponding area node H1-H7 after selecting a location in building plan 4.

Hierarchical representation 2 is also shown including user nodes U1-U5 that are associated with one or more area nodes H1-H7. Each user node U1-U5 can include user information for a corresponding user. In particular, user nodes U1-U3 can each comprise occupant information U1-U3 for a building occupant. Returning to FIG. 2, in step G3, occupant information U1-U3 for one or more building occupants can be obtained. Occupant information U1-U3 can be manually entered, automatically retrieved from an existing database or the like, or some combination thereof. For example, occupant information U1-U3 can be provided by the corresponding occupant of the building. Alternatively, occupant information U1-U3 can be imported from a human resources database or the like. Still further, occupant information U1-U3 can be dynamically obtained by communicating with a wireless device or the like that is unique to a particular occupant.

In any event, returning to FIG. 2, in step G4 a location is obtained for each occupant of the building. In one embodiment, the location can be based on the most likely location of an occupant within the building, for example, the location of an occupant's office. Alternatively, the location can be obtained and updated dynamically by communicating with, for example, a wireless device carried by the occupant as he/she moves throughout the building. Still further, a combination of the two could be used. In the latter case, a first location for an occupant can be based on his/her office and, when the occupant is not in the office, a second location can be based on the current location of the occupant. In this case, occupant information U1-U3 (FIG. 1) could include a status that indicates whether or not the occupant is present at the location. It is understood that additional status information can also be included in occupant information U1-U3. For example, any health problems that the occupant may have could be included as status information in occupant information U1-U3.

Regardless, in step G5, occupant information U1-U3 is associated with hierarchical representation 2 (FIG. 1). In particular, as shown in FIG. 1, occupant information U1-U3 can be associated with an area node H1-H7 that corresponds to the location that was obtained for the occupant. For example, occupant information U1 can be associated with sub-area node H6 that corresponds to the location of the occupant's desk, and occupant information U2 can be associated with a sub-area node H7 that corresponds to a current location of the occupant.

FIG. 1 also shows user nodes U4-U5 associated with hierarchical representation 2 that include user information for other users. User information U4-U5 can be associated with hierarchical representation 2 in a manner similar to occupant information U1-U3. However, user information U4-U5 can be associated with an area node H1-H7 based on a situation that may occur within the corresponding area. To this extent, user information U4-U5 may correspond to occupants or non-occupants of the building. For example, as described further below with reference to an illustrative application, user information U4 can correspond to an emergency responder, and be associated with floor node H3. In this case, user information U4 can be used when an emergency event occurs on the floor corresponding to floor node H3. Similarly, user information U5 can correspond to a building manager and be used when a problem occurs with the building (e.g., a water leak or heating problem).

User information for each user can be stored in a user node U1-U5, or can be stored in a user node U1-U5 having one or more child nodes. In the latter case, each user node U1-U5 can include information personal to the user (e.g., his/her name), and each child node can include information about an item associated with the corresponding user. For example, user node U3 is shown having a device node D1 as a child node. Device node D1 can include device information that corresponds to a personal device that can be used to contact the corresponding user. Other information such as electronic mailing address(es), family member(s), etc., could be similarly stored in user node U1-U5 and/or one or more child nodes.

It is understood that while hierarchical representation 2 only shows user information U1-U5 for a single user associated with an area node H1-H7, user information U1-U5 for multiple users could be associated with an area node H1-H7. For example, floor area node H5 could correspond to a conference room, and user information U1-U5 could be associated with floor area node H5 for each occupant taking part in a meeting in the conference room. Further, a user could have his/her user information U1-U5 associated with multiple area nodes H1-H7 in hierarchical representation 2 based on his/her location and/or based on one or more situations in which the user is contacted. For example, user information U4 could correspond to an occupant of floor H3. Similarly, in addition to user information U5, the building manager could have his/her information associated with an area node H1-H7 that corresponds to his/her office location. Information stored in area nodes H1-H7, user nodes U1-U5, and/or device node D1 can vary based on the applications in which hierarchical representation 2 is used. Examples of information that can be included will be discussed further below with reference to illustrative applications.

II. Overview of an Illustrative System

Figure 3:
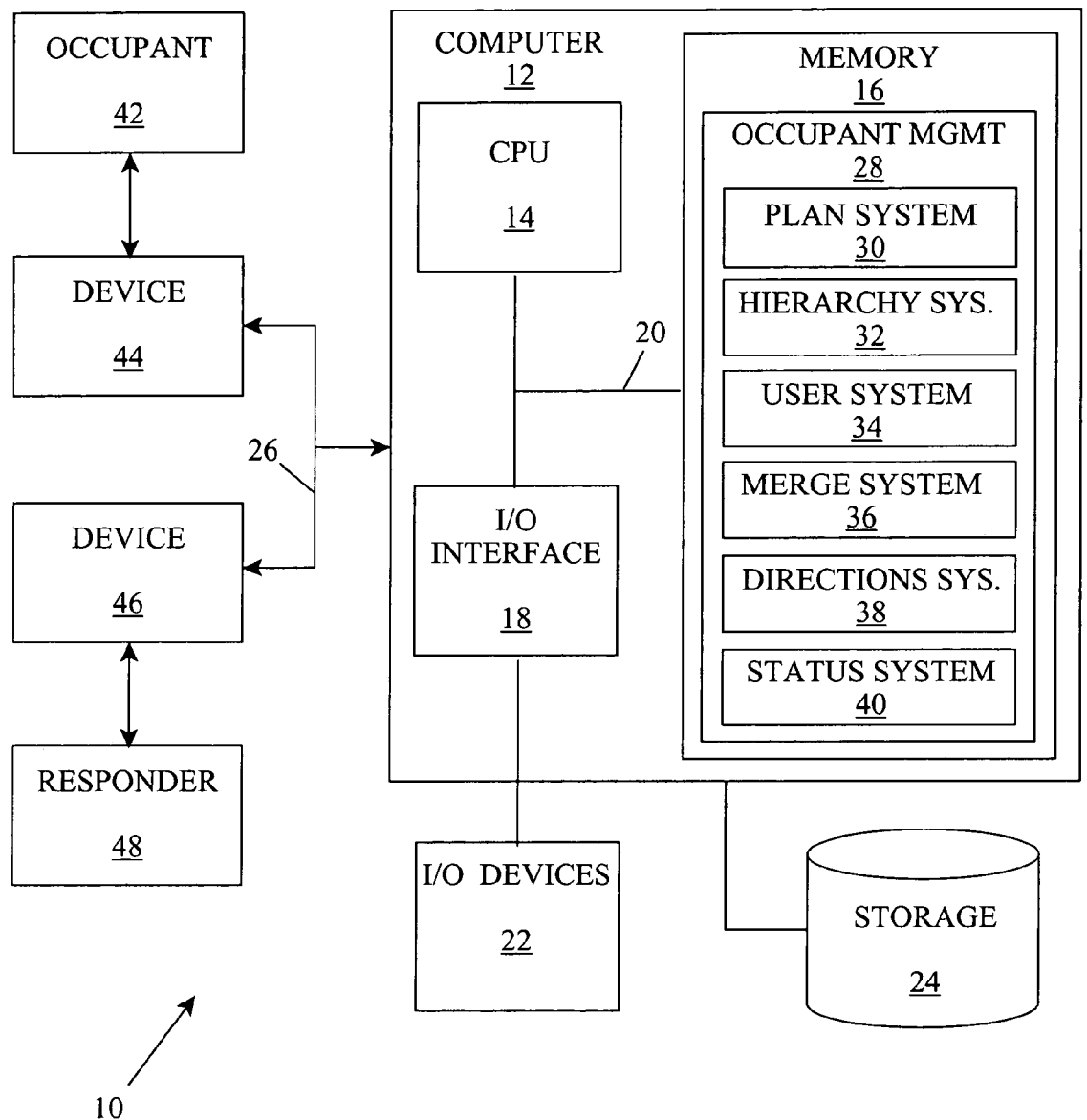
FIG. 3 shows an illustrative system for managing occupants of a physical area.

FIG. 3 shows an illustrative system 10 for managing occupants of a physical area (e.g., a building). In particular, computer 12 can obtain user information U1-U5 (FIG. 1) about an occupant 42 and/or other user such as an emergency responder 48, and store user information U1-U5 in, for example, storage unit 24. Further, user information U1-U5 can be associated with hierarchical representation 2 (FIG. 1) of the physical area that can also be stored in, for example, storage unit 24. Hierarchical representation 2 and associated user information U1-U5 can be used to provide information on the corresponding users (e.g., occupant 42 and/or responder 48) as discussed further below with reference to illustrative applications.

Users such as occupant 42 and/or responder 48 can access hierarchical representation 2 (FIG. 1) by using devices 44, 46 that communicate with computer 12 using a network 26. Further, devices 44, 46 can communicate with each other either directly over network 26 or using computer 12. To this extent, network 26 can comprise any type of communications link. For example, some or all of network 26 can comprise an addressable connection in a client-server (or server-server) environment that may utilize any combination of wireline and/or wireless transmission methods. In this instance, computer 12 and devices 44, 46 may utilize conventional network connectivity, such as Token Ring, Ethernet, WiFi or other conventional communications standards. Further, network 26 can comprise any type of network, including the Internet, a wide area network (WAN), a local area network (LAN), a virtual private network (VPN), a wireless network, etc. Where computer 12 and/or devices 44, 46 communicate via the Internet, connectivity could be provided by conventional TCP/IP sockets-based protocol, and one or more of computer 12 and devices 44, 46 could utilize an Internet service provider to establish connectivity.

As shown, computer 12 generally includes a central processing unit (CPU) 14, a memory 16, an input/output (I/O) interface 18, a bus 20, external I/O devices/resources 22, and a storage unit 24. CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Storage unit 24 may comprise any type of data storage for providing storage for information necessary to carry out the invention as described herein. As such, storage unit 24 may include one or more storage devices, such as a magnetic disk drive or an optical disk drive. Moreover, similar to CPU 14, memory 16 and/or storage unit 24 may reside at a single physical location, comprising one or more types of data storage, or be distributed across a plurality of physical systems in various forms. Further, memory 16 and/or storage unit 24 can include data distributed across, for example, a LAN, a WAN or a storage area network (SAN) (not shown).

I/O interface 18 may comprise any system for exchanging information to/from one or more external I/O devices 22. I/O devices 22 may comprise any known type of external device, including speakers, a CRT, LED screen, handheld device, keyboard, mouse, voice recognition system, speech output system, printer, monitor/display, facsimile, pager, communication hardware/software, etc. Bus 20 provides a communication link between each of the components in computer 12 and likewise may comprise any known type of transmission link, including electrical, optical, wireless, etc.

It is understood that computer 12 is only an illustrative representation of a computing device. As a result, various combinations of components may be incorporated into computer 12. It is also understood that devices 44, 46 typically include the same elements as shown in computer 12 (e.g., CPU, memory, I/O interface, etc.). These have not been separately shown and discussed for brevity. Further, it is understood that each computer 12 and device 44, 46 comprises any type of computing device capable of communicating with one or more other computing devices, such as a server, a desktop computer, a laptop, a handheld device, a mobile phone, a pager, a personal digital assistant, etc. However, it is understood that if computer 12 or a device 44, 46 is a handheld device or the like, a display could be contained within computer 12 or device 44, 46, and not as an external I/O device 22 as shown and described in FIG. 3.

Computer 12 is shown including an occupant management system 28 that manages occupants of a physical area. Various systems included in occupant management system 28 can carry out the method steps shown in FIG. 2 and described above with reference to FIG. 1. For example, occupant management system 28 is shown including a plan system 30 that can obtain a plan of a physical area, such as building plan 4 (FIG. 1), as described with reference to step G1 (FIG. 2). Occupant management system 28 is also shown including a hierarchy system 32 that can generate a hierarchical representation of the physical area, such as hierarchical representation 2 (FIG. 1), as described with reference to step G2 (FIG. 2). Further, occupant management system 28 is shown including a user system 34 for obtaining user information such as user information U1-U5 (FIG. 1) and a corresponding area of the physical area as described in steps G3-G4 (FIG. 2), and a merge system 36 for associating the user information with hierarchical representation 2 as described in step G5 (FIG. 2).

As will be discussed further below, hierarchical representation 2 (FIG. 1) and associated user information U1-U5 (FIG. 1) can be used in various applications. For example, hierarchical representation 2 can be used to obtain directions from an occupant's location to another location within the physical area. To this extent, occupant management system 28 is shown including a directions system 38. Further, hierarchical representation 2 can be accessed to determine a location of one or more occupants. To this extent, occupant management system 28 is shown including a status system 40 for obtaining a status (e.g., location, health) of one or more occupants 42. It is understood that the various systems shown implemented as part of occupant management system 28 are only illustrative systems. As a result, additional or fewer systems could be implemented based on the desired functionality. Further, one or more systems could be combined and/or split into separate systems that provide the same functionality. Still further, it is understood that devices 44, 46 could also include one or more systems that provide functionality for the current invention.

III. Applications

A. Directions and Contact Information

Returning to FIG. 1, the information stored at each area node H1-H7, and in user nodes U1-U5 can vary based on the application in which hierarchical representation 2 is used. In one application, directions system 38 (FIG. 3) can use hierarchical representation 2 to provide custom directions for an occupant 42 (FIG. 3) to move from a particular starting location to a destination location. In this case, each area node H1-H7 can include information on the exit(s) for the corresponding physical area, and can include directions from each exit for the area to each entry point for the area represented by its parent area node H1-H7. In this manner, directions can be efficiently combined using hierarchical representation 2 to generate directions from any starting location to any destination location.

For example, occupant 42 (FIG. 3) may correspond to occupant information U2, and be located in the area represented by sub-area node H7. Further, occupant 42 may desire directions from his current location to an area on the floor corresponding to floor node H3. In this case, hierarchical representation 2 can be used to obtain directions from sub-area node H7 to an entry point for floor area node H4, and from the entry point for floor area node H4 to an entry point for floor node H2 (e.g., an elevator or a staircase). These directions can be combined with directions from a corresponding entry point for floor node H3 to the destination area located on the floor corresponding to floor node H3. Further, if occupant 42 desires to use a particular entry point/exit area (e.g., stairs), then the directions can be readily customized to use the particular entry point/exit area. As is readily apparent, numerous possible routes may be selected. To efficiently select a short route, the directions to each entry point can be sorted from shortest to longest. Further, information such as distance and direction (e.g., compass direction) can be included in the directions. Various algorithms can be used to provide an efficient set of directions and remove any backtracking that may be included in the originally generated directions.

In generating directions for an occupant 42 (FIG. 3), directions system 38 (FIG. 3) can use the area node H1-H7 with which occupant 42 is associated as a default starting point. However, occupant 42 can be allowed to select any starting point. In selecting a destination point, a list of common destinations (e.g., bathroom, receptionist, building exit, conference room, etc.) can be presented to occupant 42 for selection. Further, occupant 42 can select a destination point by selecting another occupant's name, entering an office number, selecting an area on building plan 4, etc. Still further, occupant 42 can browse area nodes H1-H7 and their corresponding areas to determine the name of an occupant 42 in a particular office or the like.

To this extent, occupant information U1-U3 can include the name of the corresponding occupant 42 (FIG. 3). Contact information such as information for one or more handheld devices, mobile telephones, home telephones, email addresses, and/or pagers, a home address, etc., can also be included as occupant information U1-U3 and/or as one or more child nodes of occupant information U1-U3, such as device node D1. Further, occupant information U1-U3 and/or one or more child nodes could include a present/absent status indicating whether the corresponding occupant 42 is present within the building, logged into a network, etc. In this case, a user can determine which contact information may be successful in contacting the occupant 42. For example, when a status indicates that occupant 42 is currently available on a computer network, the user could attempt to contact occupant 42 using his/her email address.

Similarly, user information U4-U5 and/or one or more child nodes that are associated with portions of the physical area can also include some or all of the contact information stored in occupant information U1-U3. User information U4-U5 can also include information that identifies the one or more situations in which the corresponding user should be contacted. In this manner, a user can select the appropriate user that should be contacted based on the current situation, and also efficiently obtain the contact information for the user.

One or more area nodes H1-H7 could also include contact information for the corresponding area. Alternatively, this information could be included in one or more child nodes of an area node H1-H7 as shown with device node D1. For example, sub-area node H6 could correspond to an office. As a result, telephone information such as an extension number for the office, computer information such as a network address for a network outlet located in the office, and the like can be stored in area node H6 or a child node. In this case, when a user seeks to contact occupant 42 (FIG. 3), contact information stored in both the occupant information U1-U3 for occupant 42, and the area node H1-H7 corresponding to the location of occupant 42 can be provided to the user. Other contact information can also be include in one or more area nodes H1-H7. For example, information on an intercom installed in an area could be associated with the corresponding area node H1-H7. When the user associated with user information U4-U5 is an occupant of the physical area, the contact information for the user's location can also be provided to a user. It is understood that when the user is not an occupant of the physical area, his/her personal contact information could include contact information for his/her location (e.g., office telephone number). As a result, various options for contacting a particular occupant or other individual related to a physical area can be readily stored and retrieved using hierarchical representation 2.

B. Emergency Response

When an emergency event occurs, hierarchical representation 2 (FIG. 1) and/or occupant management system 28 (FIG. 3) can assist in communicating with and providing assistance to occupants 42 (FIG. 3). To this extent, it is understood that some or all of occupant management system 28 can be implemented and/or duplicated in a location that is away from the physical area (e.g., building) that is represented in hierarchical representation 2. This provides additional assurance that occupant management system 28 will continue to provide functionality during the emergency event. An emergency event may be automatically detected by occupant management system 28 using a smoke detector, hazardous material detector, an earthquake sensor, a burglar alarm, or the like, and/or the occurrence of an emergency event (e.g., a heart attack) can be manually entered by an occupant 42 or another user. In any event, occupant management system 28 can assist in obtaining various information about occupants 42 and/or providing various information to occupants 42 and/or responders 48 (FIG. 3).

Hierarchical representation 2 (FIG. 1) can be used to obtain information on occupants 42 (FIG. 3) and/or establish two-way communication between occupant 42 and one or more emergency responders 48 (FIG. 3). For example, responder 48 may comprise a co-worker of occupant 42, and occupant 42 may require emergency assistance. In a typical office, co-workers generally communicate face-to-face, by telephone extension, and/or by email. However, should responder 48 be away from his/her office, each of these modes of communication may fail. Directions system 38 (FIG. 3) can obtain user information U4 (FIG. 1) for responder 48 using hierarchical representation 2, and can provide contact information for a mobile device 46 (FIG. 3) or the like for responder 48. As a result, communication between responder 48 and occupant 42 and/or other occupants 42 capable of providing assistance may be quickly commenced. Two-way communication between occupant 42 and a non-occupant responder 48 also can be established in the same manner.

Status system 40 (FIG. 3) can be used to obtain status information for one or more occupants 42 (FIG. 3) during an emergency event such as a fire that requires evacuation of a building. In particular, information about the location of occupant 42, whether occupant 42 is injured, whether occupant 42 is safe or evacuating, etc. can be obtained during an emergency event. To this extent, the directional information stored in area nodes H1-H7 (FIG. 1) and/or contact information stored in user information U1-U5 (FIG. 1) and the functionality provided by directions system 38 (FIG. 3) can be used by status system 40. The status information can be compiled and provided to one or more emergency responders 48 (FIG. 3). As a result, responder 48 can make more informed decisions about what action to take in responding to the emergency event.

Figure 4:
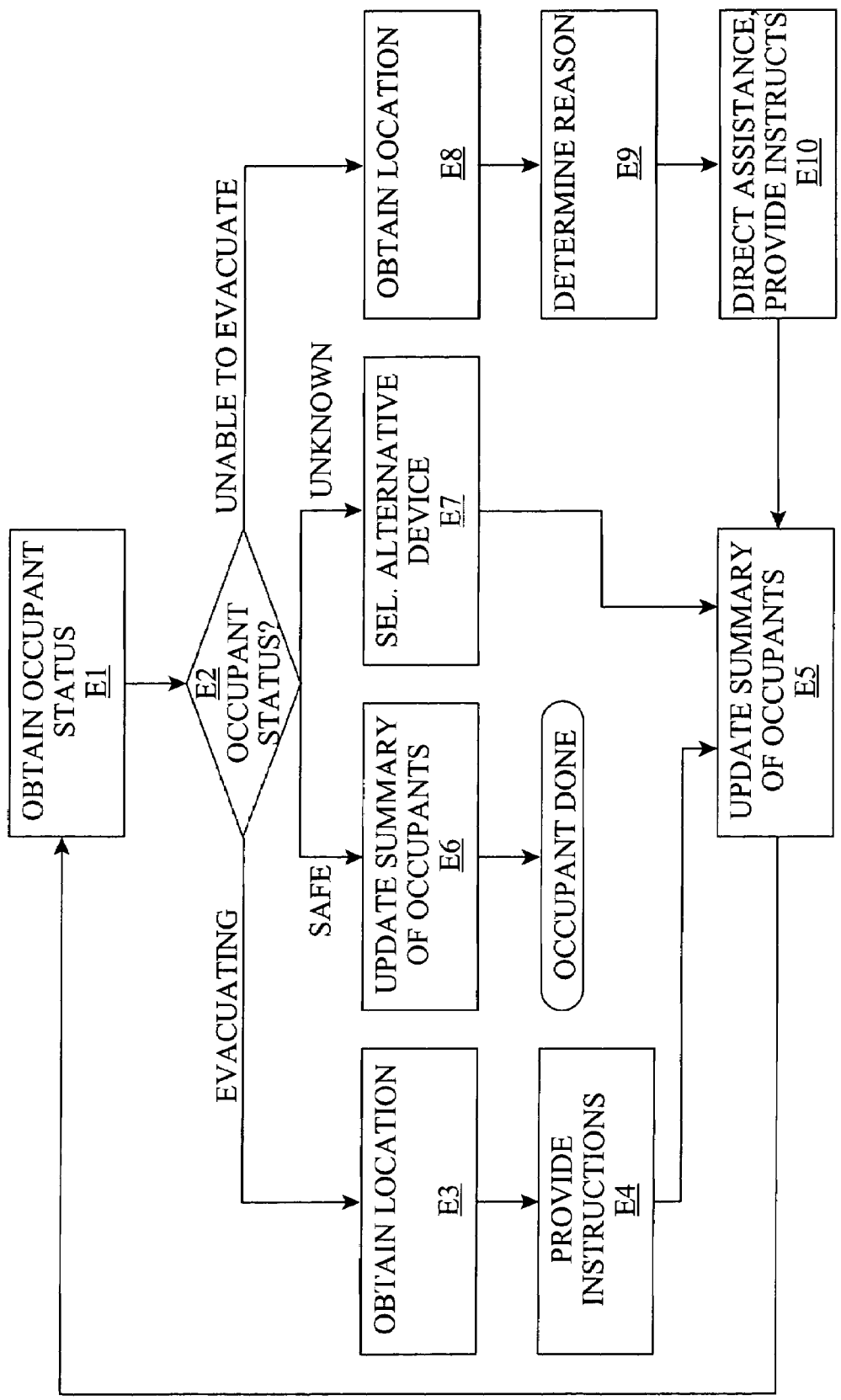
FIG. 4 shows illustrative method steps for obtaining a status of an occupant during an emergency event.

FIG. 4 shows various method steps that can be carried out by status system 40 (FIG. 3) for each occupant 42 (FIG. 3) of a building during an evacuation. In step E1, a status of occupant 42 can be obtained. For example, directions system 38 (FIG. 3) can be used to obtain a location and contact information for occupant 42. One of the various methods of contacting occupant 42 can be selected, and a message can be sent using the selected method. The selected method for contacting occupant 42 can be based on an anticipated robustness of the communications medium, and/or the known or anticipated location of occupant 42. For example, when occupant 42 has not previously logged onto a company network during the day, an initially selected communications method could comprise a mobile telephone. The number could be dialed and a recorded message could request that occupant 42 indicate his/her status. Occupant 42 could select his/her status from a list of possibilities by speaking a number or phrase, entering a number on the mobile telephone, or the like. In one embodiment, possible selections comprise evacuating, safe, or unable to evacuate. If the selected communications method fails to contact occupant 42, occupant 42 can be assigned an unknown status.

In step E2, one of various alternatives are selected based on the status of occupant 42 (FIG. 3). When occupant 42 indicates that he/she is evacuating, processing flows to step E3, in which a location of occupant 42 is obtained. The location can be obtained using any of a variety of methods. For example, occupant 42 can enter his/her location manually or verbally using device 44 (FIG. 3), the location can be automatically determined by determining the location of device 44 (e.g., computer in an office or a wireless device using a particular wireless receiver), or the like.

After determining a location of occupant 42 (FIG. 3), in step E4, status system 40 (FIG. 3) and/or responder 48 (FIG. 3) can provide one or more instructions to occupant 42. For example, status system 40 can provide directions to the nearest exit and/or an alternative exit. Further, responder 48 can direct occupant 42 to a location at which he/she can receive assistance in evacuating the building. In either case, it is understood that directions system 38 (FIG. 3) can generate the directions that are provided to occupant 42 based on a starting point (e.g., current location of occupant 42) and a selected destination point (e.g., emergency exit).

In step E5, a summary of the status of all occupants 42 (FIG. 3) is updated. The summary can indicate the total number of occupants 42 currently in the building, the number of occupants 42 that have been contacted, the status of occupants 42, and/or the location of occupants 42. As discussed further below, the location and/or number of occupants 42 that require assistance can also be displayed. This information can be displayed on personal device 46 (FIG. 3) for responder 48 (FIG. 3), on device 46 located on a response vehicle, etc. As a result, responder 48 can make more informed decisions about the appropriate actions that should be taken.

After the summary is updated, flow returns to step E1, in which a status for occupant 42 is again obtained. In one embodiment, a status can be updated after a certain amount of time has passed (e.g., one minute) until occupant 42 indicates that he/she is safe. When occupant 42 (FIG. 3) indicates that he/she is safe, flow proceeds to step E6, in which the status summary is updated that occupant 42 is safe. At this point, no more communications are required for occupant 42. However, a location could be obtained (e.g., street location) and/or occupant 42 can be directed to a particular safe location.

When status system 40 (FIG. 3) is unable to contact occupant 42 (FIG. 3), the status of occupant 42 can be set to unknown. In this case, flow can proceed to step E7, in which alternative contact information, if available, is used to again attempt to contact occupant 42. For example, status system 40 could first attempt to contact occupant 42 using his/her mobile device 44 (FIG. 3), and then select an office telephone for the probable location of occupant 42 if communications with mobile device 44 fail. To this extent, information such as whether occupant 42 was available on a computer network (e.g., logged in to work account) or not can be used to help determine a possible location of occupant 42 and thereby select an appropriate option to use in attempting to contact occupant 42. In any event, flow proceeds to step E5 in which the summary of occupants 42 is updated, and returns to step E1 in which status system 40 again attempts to obtain a status for occupant 42.

If occupant 42 (FIG. 3) indicates that he/she is unable to evacuate, flow proceeds to step E8. In step E8, a location of occupant 42 is obtained as discussed above with reference to step E3. In step E9, occupant 42 can provide a reason as to why he/she is unable to evacuate. For example, occupant 42 may have been injured, thereby requiring assistance. Alternatively, all exit routes may be unusable. In step E10, assistance can be directed for occupant 42 and/or instructions can be provided to occupant 42 based on the provided reason. For example, occupant 42 could be directed to a particular location and/or given instructions on treating his/her injury until assistance can arrive. To this extent, one or more responders 48 that may be available and/or nearby can be directed to the location of occupant 42 to provide assistance.

Information obtained for each occupant 42 (FIG. 3) can be incorporated into hierarchical representation 2 (FIG. 1) to adjust instructions and/or directions provided to other occupants 42. For example, occupant 42 may indicate that an exit is blocked. Consequently, hierarchical representation 2 can be updated to reflect that a particular exit is blocked, and directions for all other occupants 42 can avoid using that exit. Further, numerous occupants 42 may be directed to an exit (e.g., from a conference room). In this case, other occupants 42 may be directed to alternative exits to avoid crowding at a particular exit. Similarly, an occupant 42 that is also a responder 48 (FIG. 3) can be directed to a location of another occupant 42 that requires assistance.

Still further, hierarchical representation 2 (FIG. 1) can include various other information on the building that can be used during an emergency event. For example, hierarchical representation 2 can include location information for emergency equipment such as a first aid kit, fire extinguisher, etc. Occupants 42 (FIG. 3) and/or responders 48 (FIG. 3) can be directed to this emergency equipment using hierarchical representation 2. Other building information such as the locations of windows can also be included. In this case, when occupant 42 indicates that no exit routes are available, directions system 38 (FIG. 3) can direct occupant 42 to a window or the like where a responder 48 may be able to evacuate occupant 42. Other building information such as the location of windows, water pipes, heating/cooling ducts, electrical wiring, network wiring, etc. can be included in hierarchical representation 2. This information can be used, for example, when occupants 42 are unable to be contacted using telephone and/or network connections to isolate where a problem is located.

During an emergency, data can quickly change, and additional events can occur. As a result, hierarchical representation 2 (FIG. 1) can include one or more directives that are preset depending on the type of emergency event. A directive can comprise one or more preset communications that are sent to a given location and/or occupant 42 (FIG. 3). For example, a directive can be associated with each area node H1-H7 for a fire emergency, an earthquake, or the like. When a fire is detected, the corresponding directive for each area node H1-H7 can be sent to each device associated with area node H1-H7 and/or each device associated with occupants 42 located at the corresponding location. The directives can comprise, for example, an evacuation order, directions to an exit route, safety instructions, etc. To this extent, each directive could interrupt any other activity being performed using the device. For example, a user may lose the ability to continue working on a document on a personal computer until the directive is answered. Further, directives can be used to obtain the status information of occupant 42 as discussed above.

IV. Alternatives

As noted previously, the invention can be implemented on a small scale, e.g., a house, or a large scale, e.g., a city or larger. In the former case, fire fighters responding to a house fire could be readily informed of the layout of a particular house, such as the location of a child's bedroom, potential sources of fire, etc. When used on a large scale, access to information can be limited based on the hierarchical representation 2 (FIG. 1). For example, an employee occupant 42 (FIG. 3) may only be able to view user information U1-U5 (FIG. 1) for co-workers. Further, the amount of user information (FIG. 1) that can be viewed may be limited by the identification of an occupant 42 as is known in the art. When multiple buildings are included in hierarchical representation 2, additional information such as directions to/from various locations (e.g., restaurants, shops, etc.) in the area can be available. To this extent, when a large scale emergency occurs that requires the evacuation of several buildings, occupants 42 can be given directions to alternative exit routes in the hope that traffic problems and the like can be lessened.

Additional user information U1-U5 (FIG. 1) can be incorporated into hierarchical representation 2 (FIG. 1) to provide further functionality for one or more applications. For example, personal information such as family contact information, health information (e.g., allergy, disability), and the like can be included. Further, information such as scheduled meetings, out of office plans, and the like can be included as and/or associated with user information U1-U5, and used to assist in locating an occupant 42 (FIG. 3) and/or responder 48 (FIG. 3) that may not respond to directives and/or queries as discussed above.

It is understood that the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer (e.g., a finite state machine), containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of various embodiments of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method of managing a plurality of occupants including visitors of a multi-floored building with each floor having a plurality of areas during an emergency event, the method comprising:

(a) generating a data structure having a hierarchical representation of the multi-floored building, with each floor being represented by a floor node and each of the plurality of areas of each floor being represented by an area node that is relationally associated to the floor node;

(b) generating in the data structure an occupant node for each occupant in the multi-floored building and relationally associating the occupant node with one or more area nodes of a floor of the multi-floored building;

(c) generating in the data structure one or more device nodes for each occupant in the multi-floored building and relationally associating the device nodes to the occupant node for that occupant, each of the device nodes including device information for a device correlated to an area of a floor at which to contact the occupant;

(d) retrieving device information from one or more device nodes of the data structure in an emergency event that affects at least one area of at least one floor;

(e) contacting each occupant via a device associated with the retrieved device information to determine the status of that occupant at an area of a floor associated with that occupant;

(f) determining the area of the floor at which each occupant is located based on the device via which the occupant is contacted or occupant's entry using the device;

(g) receiving evacuation information from a contacted occupant relating to the determined area of the floor at which the occupant is located; and (h) using received evacuation information relating to the determined area of the floor in contacting other occupants.

2. A program storage device tangibly embodying a program of instructions executable by a machine to manage a plurality of occupants of a multi-floored building with each floor having a plurality of areas during an emergency event, the instructions comprising:

(a) generating a data structure having a hierarchical representation of the multi-floored building, with each floor being represented by a floor node and each of the plurality of areas of each floor being represented by an area node that is relationally associated to the floor node;

(b) generating in the data structure an occupant node for each occupant in the multi-floored building and relationally associating the occupant node with one or more area nodes of a floor of the multi-floored building;

(c) generating in the data structure one or more device nodes for each occupant in the multi-floored building and relationally associating the device nodes to the occupant node for that occupant, each of the device nodes including device information for a device correlated to an area of a floor at which to contact the occupant;

(d) retrieving device information from one or more device nodes of the data structure in an emergency event that affects at least one area of at least one floor;

(e) contacting each occupant via a device associated with the retrieved device information to determine the status of that occupant at an area of a floor associated with that occupant;

(f) determining the area of the floor at which each occupant is located based on the device via which the occupant is contacted or occupant's entry using the device;

(g) receiving evacuation information from a contacted occupant relating to the determined area of the floor at which the occupant is located; and (h) using received evacuation information relating to the determined area of the floor in contacting other occupants.

* * * * *